(12) United States Patent
Bai et al.

(10) Patent No.: US 12,462,854 B2
(45) Date of Patent: Nov. 4, 2025

(54) STORAGE DEVICE AND DISPLAY

(71) Applicant: Shenzhen China Star Optoelectronics Semiconductor Display Technology Co., Ltd., Guangdong (CN)

(72) Inventors: Yamei Bai, Guangdong (CN); Tianhong Wang, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 160 days.

(21) Appl. No.: 18/524,252

(22) Filed: Nov. 30, 2023

(65) Prior Publication Data
US 2024/0221801 A1 Jul. 4, 2024

(30) Foreign Application Priority Data
Dec. 30, 2022 (CN) .......................... 202211740087.7

(51) Int. Cl.
*G11C 7/10* (2006.01)
(52) U.S. Cl.
CPC .................. *G11C 7/1087* (2013.01)
(58) Field of Classification Search
CPC .................................................... G11C 7/1087

USPC ..................................................... 365/189.05
See application file for complete search history.

(56) References Cited

U.S. PATENT DOCUMENTS

| | | | |
|---|---|---|---|
| 2006/0082400 A1* | 4/2006 | Isono | H03K 5/135 327/141 |
| 2015/0055051 A1* | 2/2015 | Osawa | H10D 86/423 349/48 |
| 2018/0082642 A1* | 3/2018 | Yamanaka | G09G 3/3233 |

* cited by examiner

*Primary Examiner* — Anthan Tran
(74) *Attorney, Agent, or Firm* — PV IP PC; Wei Te Chung

(57) ABSTRACT

A storage device includes a signal input terminal, a signal output terminal, a latch, and a controller. The latch is connected between the signal input terminal and the signal output terminal, and the latch is configured to write and store data. The controller is connected between the signal input terminal and the latch. The controller includes a first transistor, a second transistor, and a control switch component, the first transistor and the second transistor are electrically connected to the latch, the control switch component is electrically connected to the first transistor and the second transistor to control the first transistor and the second transistor to be turned on or off. A leakage current of the first transistor is less than a leakage current of the second transistor, and a mobility of the second transistor is greater than a mobility of the first transistor.

20 Claims, 3 Drawing Sheets

STORAGE DEVICE AND DISPLAY

CROSS REFERENCE TO RELATED APPLICATIONS

This application claims priority to Chinese patent application Ser. No. 202211740087.7, filed on Dec. 30, 2022, and entitled "STORAGE DEVICE AND DISPLAY". The entire disclosures of the above application are incorporated herein by reference.

TECHNICAL FIELD

The present application relates to the field of display technology, in particular to a storage device and a display.

BACKGROUND

Existing semiconductor element storage devices can be roughly divided into two categories, volatile devices and non-volatile devices. Volatile devices lose stored data when power is lost, while non-volatile devices retain stored data when power is lost. Volatile devices are divided into dynamic volatile storage devices and static volatile storage devices. When a dynamic volatile storage device reads data, a charge in a capacitor is lost, therefore, each time the data is read another write operation is required. Moreover, when a transistor is in an off state, leakage current (off current) flows between a source and a drain of the transistor in a storage element, charge flows in or out even when the transistor is not turned on, as a result, a data retention period is very short, therefore, a next write operation (refresh operation) needs to be performed at regular intervals. Additionally, stored data is lost when power is lost, therefore, additional storage devices using magnetic or optical materials are required to retain data for long periods of time.

Non-volatile memory devices store data by retaining charge through a floating gate between a gate electrode and a channel formation region in the transistor. Data can be retained for a long time, and the stored data can be maintained even without power supply. However, a gate insulating layer in the transistor deteriorates due to a tunneling current generated during writing, causing the storage element to lose functionality after a certain number of writing operations. In order to reduce such issues, complex peripheral currents are used to equalize the number of write operations. This method cannot fundamentally solve the issue of life decay. In addition, injecting and removing charges from the floating gate requires high voltage and takes a long time. Therefore, writing and erasing data is slower. In other words, existing storage devices cannot achieve fast writing while ensuring long-term storage.

SUMMARY

Embodiments of the present application provide a storage device and a display, which can solve an issue that existing storage devices cannot achieve fast writing while ensuring long-term storage.

An embodiment of the present application provides a storage device comprising:
 a signal input terminal and a signal output terminal;
 a latch connected between the signal input terminal and the signal output terminal, wherein the latch is configured to write and store data; and
 a controller connected between the signal input terminal and the latch, wherein the controller comprises a first transistor, a second transistor, and a control switch component, the first transistor and the second transistor are electrically connected to the latch, the control switch component is electrically connected to the first transistor and the second transistor to control the first transistor and the second transistor to be turned on or off; wherein a leakage current of the first transistor is less than a leakage current of the second transistor, and a mobility of the second transistor is greater than a mobility of the first transistor.

Optionally, in some embodiments of this application, the first transistor and the second transistor are connected in series between the signal input terminal and the latch, the control switch component comprises a first control switch, an input terminal of the first control switch is electrically connected to an input terminal of the first transistor, and an output terminal of the first control switch is electrically connected to an output terminal of the first transistor.

Optionally, in some embodiments of this application, the control switch component further comprises a second control switch, an input terminal of the second control switch is electrically connected to an input terminal of the second transistor, and an output terminal of the second control switch is electrically connected to an output terminal of the second transistor.

Optionally, in some embodiments of this application, the first transistor and the second transistor are connected in parallel between the signal input terminal and the latch, the control switch component comprises a third control switch, an input terminal of the third control switch is electrically connected to the signal input terminal, and an output terminal of the third control switch is electrically connected to an input terminal of the first transistor or an input terminal of the second transistor to control the first transistor and the second transistor to be turned on or off.

Optionally, in some embodiments of this application, the first transistor and the second transistor are connected in parallel between the signal input terminal and the latch, the control switch component comprises a third control switch, an output terminal of the third control switch is electrically connected to the latch, and an input terminal of the third control switch is electrically connected to an output terminal of the first transistor or an output terminal of the second transistor to control the first transistor and the second transistor to be turned on or off.

Optionally, in some embodiments of this application, the first transistor and the second transistor are connected in parallel between the signal input terminal and the latch, the control switch component comprises a fourth control switch and a fifth control switch, the fourth control switch and the first transistor are connected in series between the signal input terminal and the latch, and the fifth control switch and the second transistor are connected in series between the signal input terminal and the latch.

Optionally, in some embodiments of this application, on and off of the first transistor and the second transistor are correspondingly controlled by on and off of the fourth control switch and the fifth control switch.

Optionally, in some embodiments of this application, the first transistor is an oxide transistor; the second transistor is a monocrystalline silicon transistor or a polycrystalline silicon transistor.

Optionally, in some embodiments of this application, the leakage current of the first transistor is less than or equal to $1*10^{-12}$ A.

Optionally, in some embodiments of this application, the mobility of the second transistor is greater than or equal to 10 cm$^2$/V·s.

Correspondingly, an embodiment of the present application further provides a display, which includes the storage device described in any one of the above.

In the embodiment of the present application, the storage device includes a signal input terminal, a signal output terminal, a latch, and a controller. The latch is connected between the signal input terminal and the signal output terminal, and the latch is configured to write and store data. The controller is connected between the signal input terminal and the latch. The controller includes a first transistor, a second transistor, and a control switch component, the first transistor and the second transistor are electrically connected to the latch, the control switch component is electrically connected to the first transistor and the second transistor to control the first transistor and the second transistor to be turned on or off. A leakage current of the first transistor is less than a leakage current of the second transistor, and a mobility of the second transistor is greater than a mobility of the first transistor. In this application, the first transistor and the second transistor are simultaneously provided in the controller, and a control switch component is configured to control the first transistor and the second transistor to be turned on or off. This enables fast writing of the storage device by utilizing a high mobility of the second transistor during writing. During storage, a low leakage current of the first transistor can be utilized to achieve a long-term storage of the storage device, thereby enabling the storage device to achieve fast writing while ensuring a long-term storage.

BRIEF DESCRIPTION OF THE DRAWINGS

In order to illustrate the technical solutions more clearly in the embodiments of the present application, the following briefly introduces the drawings that need to be used in the description of the embodiments. Obviously, the drawings in the following description are only some embodiments of the present application. For those skilled in the art, other drawings can also be obtained based on these drawings without any creative effort.

DETAILED DESCRIPTION OF ILLUSTRATED EMBODIMENTS

Figure 1:
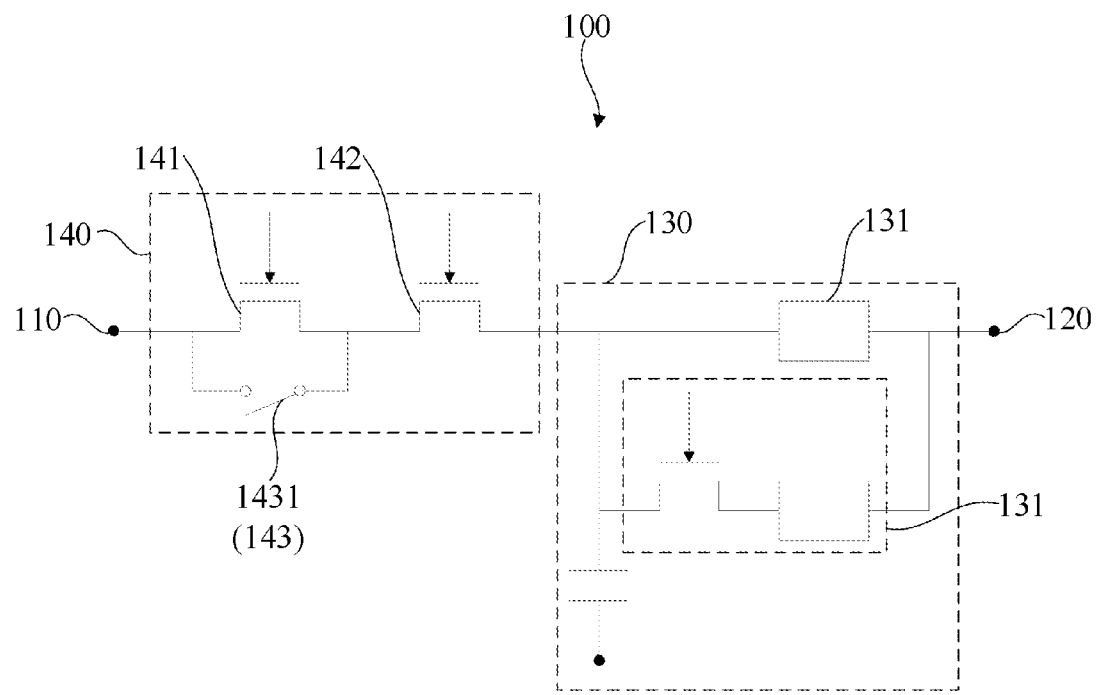
FIG. 1 is a schematic circuit structure diagram of a storage device provided by an embodiment of the present application.

The following will clearly and completely describe the technical solutions in the embodiments of the present invention with reference to the drawings in the embodiments of the present invention. Apparently, the described embodiments are only some of the embodiments of the present invention, but not all of them. Based on the embodiments of the present invention, all other embodiments obtained by those skilled in the art without creative efforts fall within the protection scope of the present invention. In addition, it should be understood that the specific embodiments described here are only used to illustrate and explain the present invention and are not intended to limit the present invention. In the present invention, unless stated otherwise, the used orientation words such as "up" and "down" usually refer to the up and down of the device in actual use or working state, specifically the directions in the drawings. The "inside" and "outside" refer to the outline of the installation.

An embodiment of the present application provides a storage device and a display, which will be described in detail below. It should be noted that the order of description of the following embodiments does not limit the preferred order of the embodiments.

First, an embodiment of the present application provides a storage device. As shown in FIG. 1, the storage device 100 includes a signal input terminal 110 and a signal output terminal 120. By inputting a control signal from the signal input terminal 110 and designing the circuit between the signal input terminal 110 and the signal output terminal 120, the writing, erasing, and storing functions of the storage device 100 can be realized.

The storage device 100 includes a latch 130. The latch 130 is connected between the signal input terminal 110 and the signal output terminal 120. The latch 130 is configured to write and store data. That is, the latch 130 serves as a storage part of the storage device 100 and is configured to store data written in the storage device 100 in real time. The latch 130 is provided with a latch circuit 131, which is configured to cyclically write, store, and erase data. Through the design of the latch circuit 131, different usage requirements of the storage device 100 can be met. The specific structure of the latch circuit 131 can also be designed and adjusted according to the actual usage requirements of the storage device 100 and is not specifically limited here.

The storage device 100 includes a controller 140. The controller 140 is connected between the signal input terminal 110 and the latch 130. That is, after a control signal is input from the signal input terminal 110, it needs to first pass through the controller 140 and then be transmitted to the latch 130, so as to realize control of the latch 130 by the controller 140.

The controller 140 includes a first transistor 141, a second transistor 142, and a control switch component 143. The first transistor 141 and the second transistor 142 are electrically connected to the latch 130. The control switch component 143 is electrically connected to the first transistor 141 and the second transistor 142 to control the first transistor 141 and the second transistor 142 to be turned on or off. A leakage current of the first transistor 141 is less than a leakage current of the second transistor 142, and a mobility of the second transistor 142 is greater than a mobility of the first transistor 141. That is, the first transistor 141 is a low leakage current type transistor, and the second transistor 142 is a high mobility type transistor.

During use of the storage device 100, when data needs to be written or erased, the control switch component 143 controls the first transistor 141 to be turned off and the second transistor 142 to be turned on, this enables the high-mobility second transistor 142 to be used to implement fast writing and erasing of the storage device 100 during the writing and erasing stages. When data needs to be stored, the first transistor 141 is controlled to turn on through the control switch component 143, the first transistor 141 is connected to the circuit, and the first transistor 141 is set to an off state. The first transistor 141 is a low leakage current type transistor, so that even if a leakage current flows between a source and a drain of the first transistor 141 during the storage process, the current flowing therein is also extremely small, thereby helping to increase storage time of the storage device 100.

That is to say, through the control switch component 143 controlling the first transistor 141 and the second transistor 142 to be turned on or off, this enables the high mobility of the second transistor 142 to be used to implement fast writing and erasing of the storage device 100 during the writing and erasing stages. During the storage stage, the low leakage current of the first transistor 141 can be utilized to achieve a long-term storage of the storage device 100. Therefore, the storage device 100 can achieve fast writing and erasing while ensuring the advantage of long-term storage.

In the embodiment of the present application, the storage device 100 includes a signal input terminal 110, a signal output terminal 120, a latch 130, and a controller 140. The latch 130 is connected between the signal input terminal 110 and the signal output terminal 120, and the latch 130 is configured to write and store data. The controller 140 is connected between the signal input terminal 110 and the latch 130. The controller 140 includes a first transistor 141, a second transistor 142, and a control switch component 143. The control switch component 143 is electrically connected to the first transistor 141 and the second transistor 142 to control the first transistor 141 and the second transistor 142 to be turned on or off. A leakage current of the first transistor 141 is less than a leakage current of the second transistor 142, and a mobility of the second transistor 142 is greater than a mobility of the first transistor 141.

Figure 2:
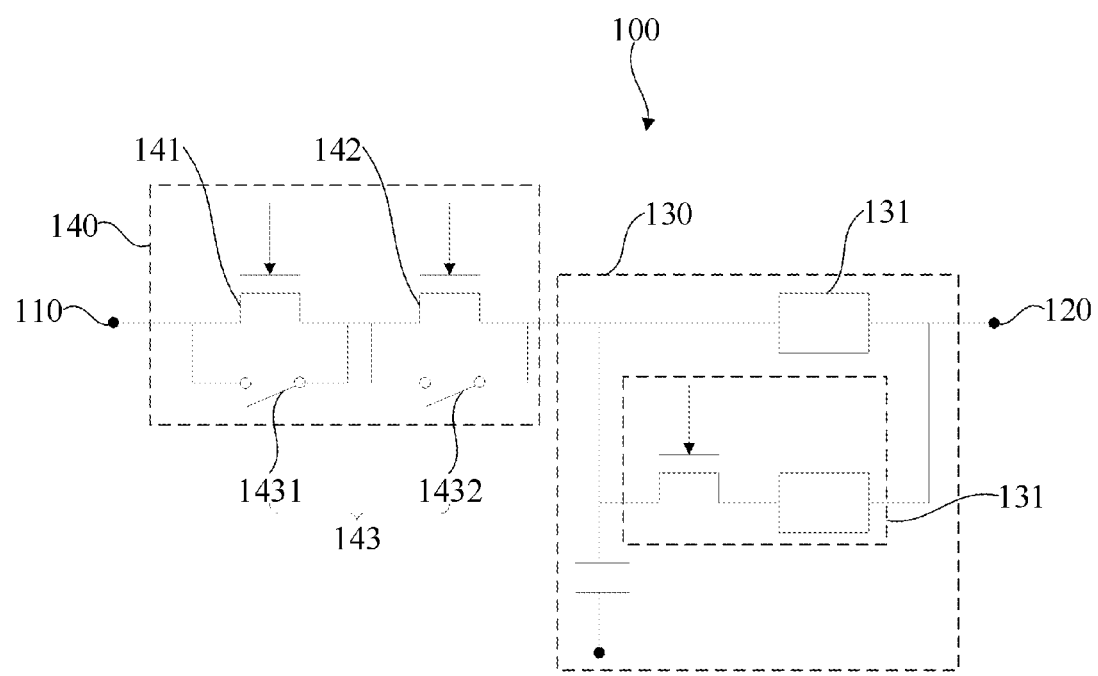
FIG. 2 is a schematic circuit structure diagram of another storage device provided by an embodiment of the present application.

Optionally, as shown in FIG. 1 and FIG. 2, the first transistor 141 and the second transistor 142 are connected in series between the signal input terminal 110 and the latch 130. The connection sequence of the first transistor 141 and the second transistor 142 between the signal input terminal 110 and the latch 130 can be adjusted according to the design requirements of the controller 140. The control switch component 143 includes a first control switch 1431. An input terminal of the first control switch 1431 is electrically connected to an input terminal of the first transistor 141. An output terminal of the first control switch 1431 is electrically connected to an output terminal of the first transistor 141. That is, the first control switch 1431 is connected in parallel with the first transistor 141 to control whether the first transistor 141 is turned on or off.

Specifically, as shown in FIG. 1, during the writing and erasing stages of the storage device 100, the first control switch 1431 is closed. At this time, a short circuit occurs between the input terminal and the output terminal of the first transistor 141. The control signal is transmitted from the first control switch 1431 to the second transistor 142 through the signal input terminal 110 and then to the latch 130. This enables the storage device 100 to utilize the high mobility of the second transistor 142 to achieve fast writing and erasing.

During the storage stage of the storage device 100, the first control switch 1431 is turned off. At this time, the first transistor 141 and the second transistor 142 are connected in series, and the first transistor 141 and the second transistor 142 are in the off state. When data flows in the latch 130 in the form of electric charge, even though electric charge can flow quickly between a source and a drain of the second transistor 142, the leakage current of the first transistor 141 is small, when the charge passes through the first transistor 141, its flow between the source and the drain of the first transistor 141 is also very small, this enables the storage device 100 to utilize the low leakage current of the first transistor 141 to achieve long-term storage.

In some embodiments, as shown in FIG. 2, the control switch component 143 further includes a second control switch 1432. An input terminal of the second control switch 1432 is electrically connected to an input terminal of the second transistor 142, and an output terminal of the second control switch 1432 is electrically connected to an output terminal of the second transistor 142. That is, the second control switch 1432 is connected in parallel with the second transistor 142 to control whether the second transistor 142 is turned on or off.

Specifically, during the writing and erasing stages of the storage device 100, the first control switch 1431 is closed and the second control switch 1432 is opened. At this time, a short circuit occurs between the input terminal and the output terminal of the first transistor 141, and the second transistor 142 can be successfully connected to the circuit. The control signal is transmitted from the first control switch 1431 to the second transistor 142 through the signal input terminal 110 and then to the latch 130. This enables the storage device 100 to utilize the high mobility of the second transistor 142 to achieve fast writing and erasing.

During the storage stage of the storage device 100, the first control switch 1431 is turned off, and the second control switch 1432 can be selected to be turned off or closed. If the second control switch 1432 is turned off, the first transistor 141 and the second transistor 142 are connected in series, and their working principles are consistent with those in the above embodiments, which will not be described again here. If the second control switch 1432 is closed, a short circuit occurs between the input terminal and the output terminal of the second transistor 142, and only the first transistor 141 is connected to the circuit. When the data in the latch 130 flows in the form of electric charge, its flow between the source and the drain of the first transistor 141 is extremely small, this enables the storage device 100 to utilize the low leakage current of the first transistor 141 to achieve long-term storage.

Figure 3:
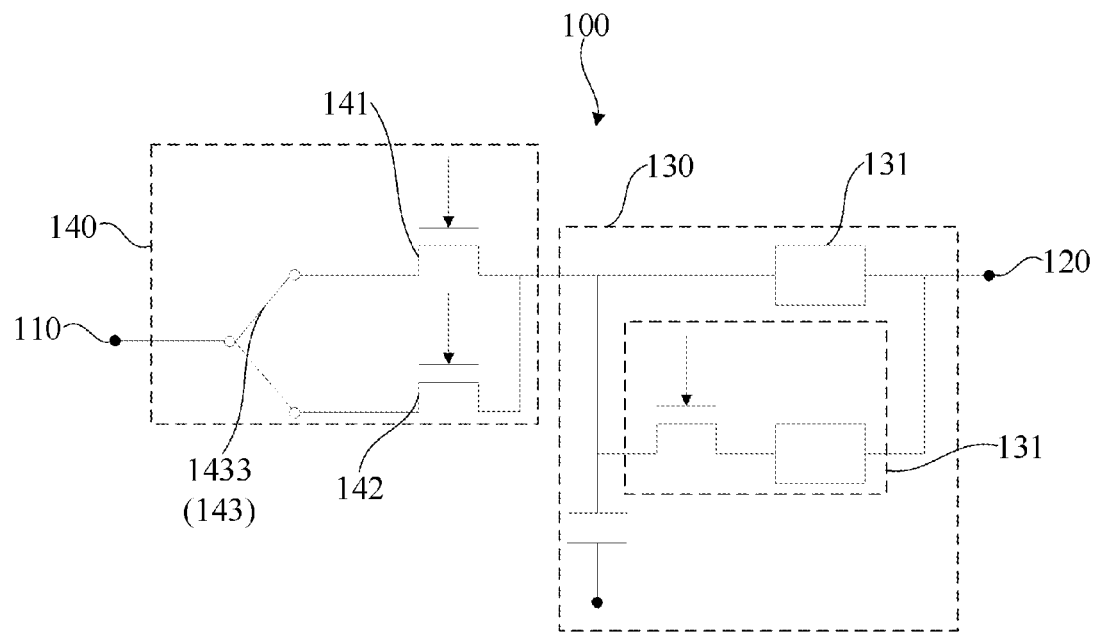
FIG. 3 is a schematic circuit structure diagram of another storage device provided by an embodiment of the present application.

Optionally, as shown in FIG. 3, the first transistor 141 and the second transistor 142 are connected in parallel between the signal input terminal 110 and the latch 130. The control switch component 143 includes a third control switch 1433. An input terminal of the third control switch 1433 is electrically connected to the signal input terminal 110. An output terminal of the third control switch 1433 is electrically connected to the input terminal of the first transistor 141 or the input terminal of the second transistor 142 to control the first transistor 141 and the second transistor 142 to be turned on or off. That is, the output terminal of the third control switch 1433 can be selectively electrically connected to the input terminal of the first transistor 141 or the input terminal of the second transistor 142, so as to correspondingly connect the first transistor 141 or the second transistor 142 to the circuit.

Specifically, during the writing and erasing stages of the storage device 100, the output terminal of the third control switch 1433 is electrically connected to the input terminal of the second transistor 142. This enables the second transistor 142 to smoothly connect to the circuit. The control signal is transmitted from the third control switch 1433 to the second transistor 142 through the signal input terminal 110 and then to the latch 130. This enables the storage device 100 to utilize the high mobility of the second transistor 142 to achieve fast writing and erasing.

During the storage stage of the storage device 100, the output terminal of the third control switch 1433 is electrically connected to the input terminal of the first transistor 141, the first transistor 141 can be successfully connected to the circuit, and the first transistor 141 is in a cut-off state. When the data of the latch 130 flows in the form of electric charge, its flow between the source and the drain of the first transistor 141 is extremely small, this enables the storage device 100 to utilize the low leakage current of the first transistor 141 to achieve long-term storage.

Figure 4:
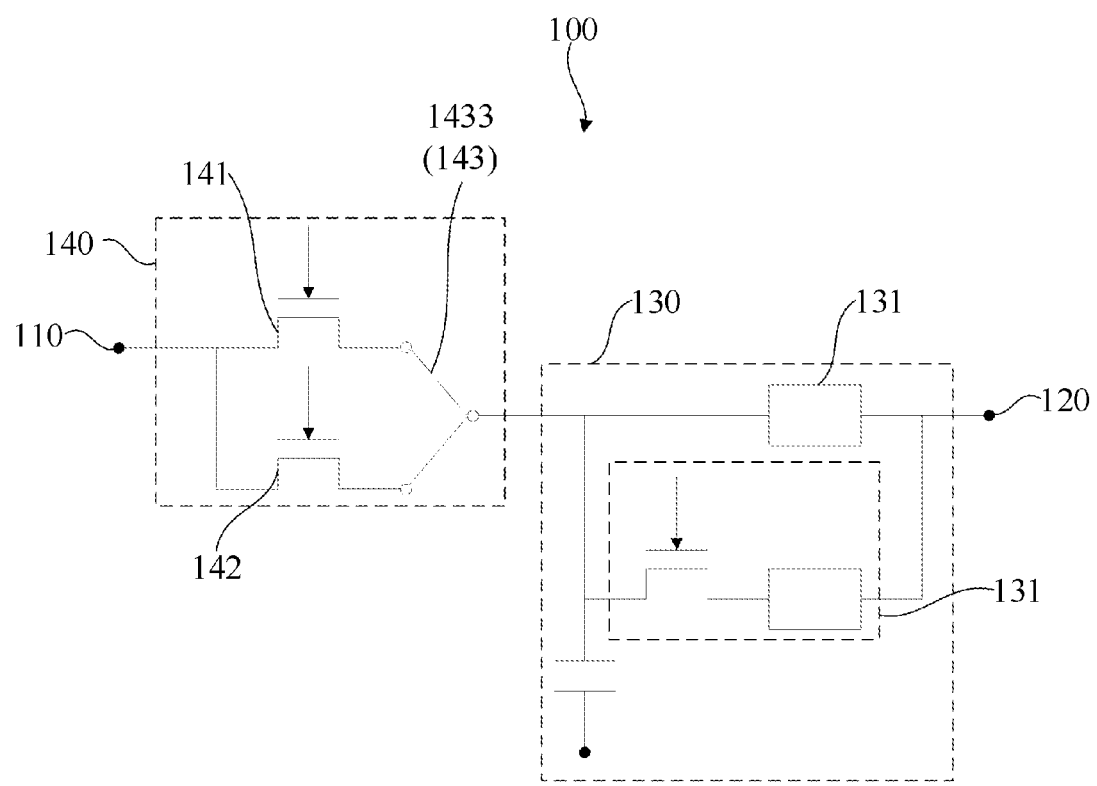
FIG. 4 is a schematic circuit structure diagram of another storage device provided by an embodiment of the present application.

In some embodiments, as shown in FIG. 4, the first transistor 141 and the second transistor 142 are connected in parallel between the signal input terminal 110 and the latch 130. The control switch component 143 includes a third control switch 1433. An output end of the third control switch 1433 is electrically connected to the latch 130. An input terminal of the third control switch 1433 is electrically connected to the output terminal of the first transistor 141 or the output terminal of the second transistor 142 to control the first transistor 141 and the second transistor 142 to be turned on or off. That is, the input terminal of the third control switch 1433 can be selectively electrically connected to the output terminal of the first transistor 141 or the output terminal of the second transistor 142, so as to correspondingly connect the first transistor 141 or the second transistor 142 to the circuit.

Specifically, during the writing and erasing stages of the storage device 100, the input terminal of the third control switch 1433 is electrically connected to the output terminal of the second transistor 142. This enables the second transistor 142 to smoothly connect to the circuit. The control signal is transmitted to the second transistor 142 through the signal input terminal 110, and then transmitted to the latch 130 through the third control switch 1433. This enables the storage device 100 to utilize the high mobility of the second transistor 142 to achieve fast writing and erasing.

During the storage stage of the storage device 100, the input terminal of the third control switch 1433 is electrically connected to the output terminal of the first transistor 141. The first transistor 141 can be successfully connected to the circuit, and the first transistor 141 is in a cut-off state. When the data in the latch 130 flows in the form of electric charge, its flow between the source and the drain of the first transistor 141 is extremely small. This enables the storage device 100 to utilize the low leakage current of the first transistor 141 to achieve long-term storage.

Figure 5:
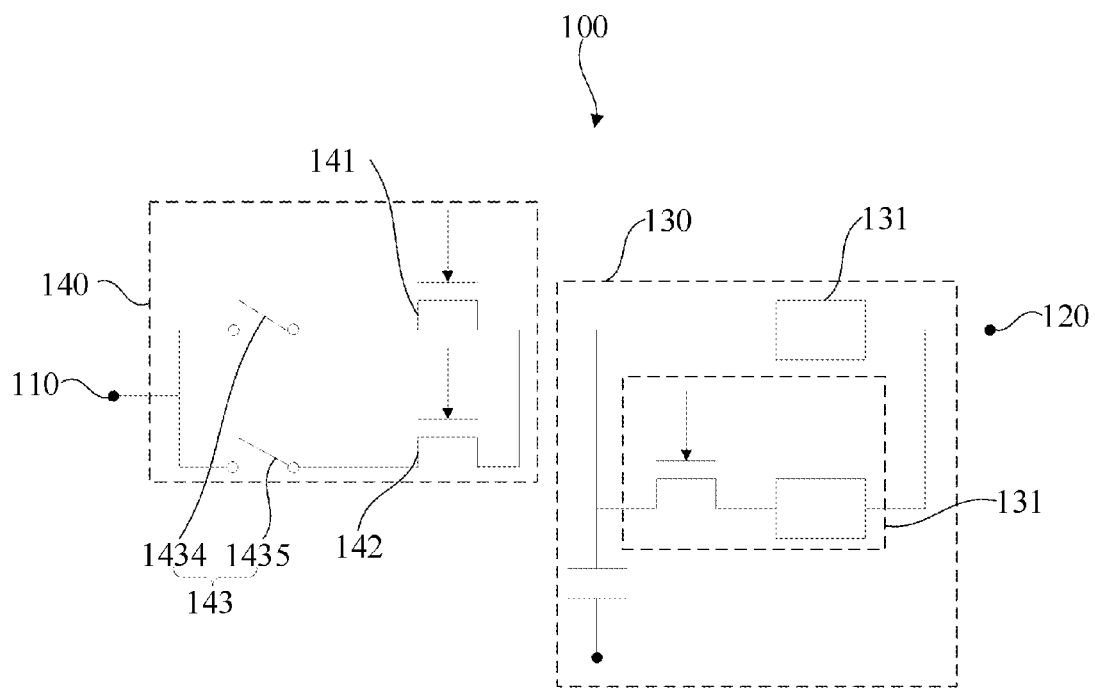
FIG. 5 is a schematic circuit structure diagram of another storage device provided by an embodiment of the present application.

In other embodiments, as shown in FIG. 5, the first transistor 141 and the second transistor 142 are connected in parallel between the signal input terminal 110 and the latch 130. The control switch component 143 includes a fourth control switch 1434 and a fifth control switch 1435. The fourth control switch 1434 and the first transistor 141 are connected in series between the signal input terminal 110 and the latch 130. The fifth control switch 1435 and the second transistor 142 are connected in series between the signal input terminal 110 and the latch 130. By turning on and off the fourth control switch 1434 and the fifth control switch 1435, the on and off of the first transistor 141 and the second transistor 142 can be correspondingly controlled to meet different usage scenarios of the storage device 100.

Specifically, during the writing and erasing stages of the storage device 100, the fifth control switch 1435 is closed and the fourth control switch 1434 is opened. The second transistor 142 is successfully connected to the circuit. The control signal is transmitted from the fifth control switch 1435 to the second transistor 142 through the signal input terminal 110 and then to the latch 130. This enables the storage device 100 to utilize the high mobility of the second transistor 142 to achieve fast writing and erasing.

During the storage stage of the storage device 100, the fourth control switch 1434 is closed and the fifth control switch 1435 is opened. The first transistor 141 is successfully connected to the circuit, and the first transistor 141 is in a cut-off state. When data in the latch 130 flows in the form of electric charge, its flow between the source and the drain of the first transistor 141 is extremely small. This enables the storage device 100 to utilize the low leakage current of the first transistor 141 to achieve long-term storage.

Optionally, in this embodiment of the present application, the first transistor 141 can be an oxide transistor, that is, the active layer of the first transistor 141 is made of an oxide semiconductor material to achieve low leakage current of the first transistor 141. The second transistor 142 can be a monocrystalline silicon transistor or a polycrystalline silicon transistor, that is, the active layer of the second transistor 142 is made of monocrystalline silicon or polycrystalline silicon material to achieve high mobility of the second transistor 142.

The leakage current of the first transistor 141 is less than or equal to $1*10^{-12}$ A. When the storage device 100 is in the storage stage, if the data in the latch 130 flows in the form of electric charge, its flow between the source and the drain of the first transistor 141 is also extremely small, thereby realizing long-term storage of the storage device 100.

Specifically, during the actual manufacturing process, the leakage current of the first transistor 141 can be designed to be $1*10^{-12}$ A, $8*10^{-13}$ A, $5*10^{-13}$ A, $2*10^{-13}$ A or $1*10^{-13.4}$, etc. The specific value can be adjusted accordingly according to the actual usage requirements of the storage device 100, as long as the storage device 100 can utilize the low leakage current of the first transistor 141 to achieve long-term storage, and there is no special restriction here.

The mobility of the second transistor 142 is greater than or equal to 10 cm$^2$/V·s, so that during the writing and erasing stages of the storage device 100, the high mobility of the second transistor 142 can be used to achieve fast writing and erasing of the storage device 100. In the actual manufacturing process, the mobility of the second transistor 142 can be designed to be 10 cm$^2$/V·s, 12 cm$^2$/V·s, 15 cm$^2$/V·s, 18 cm$^2$/V·s, or 20 cm$^2$/V·s, etc. The specific value can be adjusted accordingly according to the actual usage requirements of the storage device 100, as long as the storage device 100 can utilize the high mobility of the second transistor 142 to achieve fast writing and erasing, and there is no special restriction here.

An embodiment of the present application also provides a display, which includes a storage device. The specific structure of the storage device refers to the above embodiment. This display adopts all the technical solutions of all the above embodiments, and therefore has at least all the beneficial effects brought by the technical solutions of the above embodiments, which will not be described again here.

Figure 6:
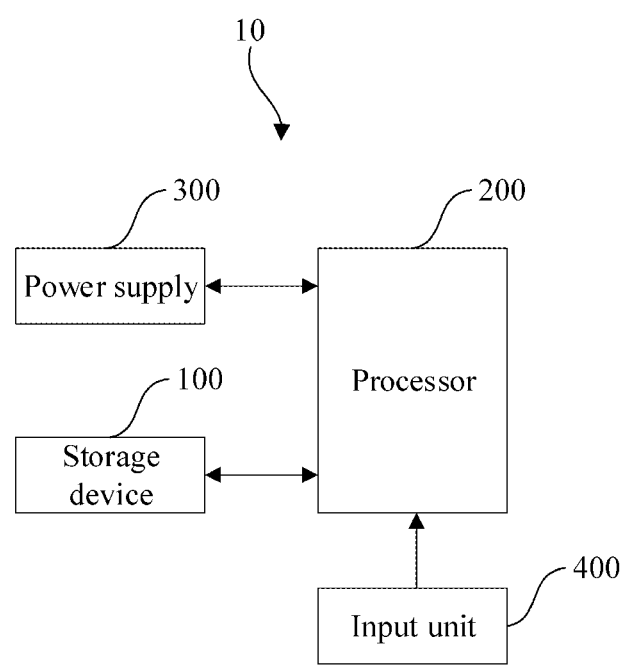
FIG. 6 is a schematic structural diagram of a display provided by an embodiment of the present application.

As shown in FIG. 6, the display 10 may include one or more processors 200 of one or more processing cores, one or more storage devices 100, a power supply 300, an input unit 400, and other components. Those skilled in the art can understand that the structure of the display 10 shown in FIG. 6 does not limit the display 10 and may include more or fewer components than shown, or combine certain components, or arrange different components.

The processor 200 is a control center of the display 10. Various interfaces and lines are used to connect various parts of the entire display 10. By running or executing software programs and/or modules stored in the storage device 100 and calling data stored in the storage device 100, various functions of the display 10 are executed and data is processed, thereby controlling the display mode of the display 10.

The storage device 100 mainly includes a controller 140 and a latch 130. The latch 130 serves as a storage part of the storage device 100 and is configured to store data written in the storage device 100 in real time. The controller 140 is configured to regulate the corresponding control circuit composition when the storage device 100 is in the writing and erasing stages or the storage stage, so as to realize different usage functions of the latch 130. In addition, the storage device 100 may include high-speed random access memory, and may also include non-volatile memory, such as at least one magnetic disk storage device, flash memory device, or other volatile solid-state storage device.

The display 10 also includes a power supply 300 that powers various components. The power supply 300 can be logically connected to the processor 200 through the power supply 300 management system, so that functions such as charging, discharging, and power consumption management can be implemented through the power supply 300 management system. The power supply 300 may also include one or more DC or AC power supplies 300, a recharging system, a power supply 300 fault detection circuit, a power supply 300 converter or inverter, a power supply 300 status indicator, and other arbitrary components.

The display 10 may further include an input unit 400. The input unit 400 may be used to receive input numeric or character information and generate keyboard, mouse, joystick, optical or trackball signal input related to user settings and function control. Although not shown, the display 10 may also include a display unit and the like, which will not be described again here.

The above describes in detail a storage device and a display provided by embodiments of the present application. This article uses specific examples to illustrate the principles and implementation methods of the present application. The description of the above embodiments is only used to help understand the method and its core idea of the present application. At the same time, for those skilled in the art, there will be changes in the specific implementation and application scope based on the ideas of the present application. In summary, the contents of this specification should not be construed as limiting the present application.

What is claimed is:

1. A storage device, comprising:
   a signal input terminal and a signal output terminal;
   a latch connected between the signal input terminal and the signal output terminal, wherein the latch is configured to write and store data; and
   a controller connected between the signal input terminal and the latch, wherein the controller comprises a first transistor, a second transistor, and a control switch component, the first transistor and the second transistor are electrically connected to the latch, the control switch component is electrically connected to the first transistor and the second transistor to control the first transistor and the second transistor to be turned on or off; wherein a leakage current of the first transistor is less than a leakage current of the second transistor, and a mobility of the second transistor is greater than a mobility of the first transistor.

2. The storage device according to claim 1, wherein the first transistor and the second transistor are connected in series between the signal input terminal and the latch, the control switch component comprises a first control switch, an input terminal of the first control switch is electrically connected to an input terminal of the first transistor, and an output terminal of the first control switch is electrically connected to an output terminal of the first transistor.

3. The storage device according to claim 2, wherein the control switch component further comprises a second control switch, an input terminal of the second control switch is electrically connected to an input terminal of the second transistor, and an output terminal of the second control switch is electrically connected to an output terminal of the second transistor.

4. The storage device according to claim 1, wherein the first transistor and the second transistor are connected in parallel between the signal input terminal and the latch, the control switch component comprises a third control switch, an input terminal of the third control switch is electrically connected to the signal input terminal, and an output terminal of the third control switch is electrically connected to an input terminal of the first transistor or an input terminal of the second transistor to control the first transistor and the second transistor to be turned on or off.

5. The storage device according to claim 1, wherein the first transistor and the second transistor are connected in parallel between the signal input terminal and the latch, the control switch component comprises a third control switch, an output terminal of the third control switch is electrically connected to the latch, and an input terminal of the third control switch is electrically connected to an output terminal of the first transistor or an output terminal of the second transistor to control the first transistor and the second transistor to be turned on or off.

6. The storage device according to claim 1, wherein the first transistor and the second transistor are connected in parallel between the signal input terminal and the latch, the control switch component comprises a fourth control switch and a fifth control switch, the fourth control switch and the first transistor are connected in series between the signal input terminal and the latch, and the fifth control switch and the second transistor are connected in series between the signal input terminal and the latch.

7. The storage device according to claim 1, wherein on and off of the first transistor and the second transistor are correspondingly controlled by on and off of the fourth control switch and the fifth control switch.

8. The storage device according to claim 1, wherein the first transistor is an oxide transistor; the second transistor is a monocrystalline silicon transistor or a polycrystalline silicon transistor.

9. The storage device according to claim 1, wherein the leakage current of the first transistor is less than or equal to $1*10^{-12}$ A.

10. The storage device according to claim 1, wherein the mobility of the second transistor is greater than or equal to 10 cm$^2$/V·s.

11. A display, comprising:
    a storage device comprising:
       a signal input terminal and a signal output terminal;
       a latch connected between the signal input terminal and the signal output terminal, wherein the latch is configured to write and store data; and
       a controller connected between the signal input terminal and the latch, wherein the controller comprises a first transistor, a second transistor, and a control switch component, the first transistor and the second transistor are electrically connected to the latch, the control switch component is electrically connected to the first transistor and the second transistor to control the first transistor and the second transistor to be turned on or off; wherein a leakage current of the first transistor is less than a leakage current of the second transistor, and a mobility of the second transistor is greater than a mobility of the first transistor.

12. The display according to claim 11, wherein the first transistor and the second transistor are connected in series between the signal input terminal and the latch, the control switch component comprises a first control switch, an input terminal of the first control switch is electrically connected to an input terminal of the first transistor, and an output terminal of the first control switch is electrically connected to an output terminal of the first transistor.

13. The display according to claim 12, wherein the control switch component further comprises a second control switch, an input terminal of the second control switch is electrically connected to an input terminal of the second transistor, and an output terminal of the second control switch is electrically connected to an output terminal of the second transistor.

14. The display according to claim 11, wherein the first transistor and the second transistor are connected in parallel between the signal input terminal and the latch, the control switch component comprises a third control switch, an input terminal of the third control switch is electrically connected to the signal input terminal, and an output terminal of the third control switch is electrically connected to an input terminal of the first transistor or an input terminal of the second transistor to control the first transistor and the second transistor to be turned on or off.

15. The display according to claim 11, wherein the first transistor and the second transistor are connected in parallel between the signal input terminal and the latch, the control switch component comprises a third control switch, an output terminal of the third control switch is electrically connected to the latch, and an input terminal of the third control switch is electrically connected to an output terminal of the first transistor or an output terminal of the second transistor to control the first transistor and the second transistor to be turned on or off.

16. The display according to claim 11, wherein the first transistor and the second transistor are connected in parallel between the signal input terminal and the latch, the control switch component comprises a fourth control switch and a fifth control switch, the fourth control switch and the first transistor are connected in series between the signal input terminal and the latch, and the fifth control switch and the second transistor are connected in series between the signal input terminal and the latch.

17. The display according to claim 11, wherein on and off of the first transistor and the second transistor are correspondingly controlled by on and off of the fourth control switch and the fifth control switch.

18. The display according to claim 11, wherein the first transistor is an oxide transistor; the second transistor is a monocrystalline silicon transistor or a polycrystalline silicon transistor.

19. The display according to claim 11, wherein the leakage current of the first transistor is less than or equal to $1*10^{-12}$ A.

20. The display according to claim 11, wherein the mobility of the second transistor is greater than or equal to 10 cm$^2$/V·s.

* * * * *